UNITED STATES PATENT OFFICE.

ANTHONY L. FLEURY, OF PITTSBURG, PENNSYLVANIA.

IMPROVEMENT IN DESULPHURIZING GOLD AND SILVER ORES.

Specification forming part of Letters Patent No. 56,027, dated July 3, 1866.

*To all whom it may concern:*

Be it known that I, ANTHONY L. FLEURY, of the city of Pittsburg, Allegheny county, in the State of Pennsylvania, have invented a new and useful Improvement in the Treatment of Gold and Silver Ores and Tailings; and I do hereby declare that the following is a clear and exact description of the same.

The nature of my invention consists in mixing the crushed or ground sulphurets or tailings with bituminous coal in powder form, or with the refuse from coal-mines, or with any analogous carboniferous coking substance, such as gas-tar or petroleum refuse, singly or mixed together, and subjecting the same, in a coke or other suitable furnace, to a red heat sufficient to convert the mixture into a metalliferous coke, but not to melt the metals. Sulphureted hydrogen and bisulphide of carbon are formed, and may be condensed and utilized.

When this metalliferous coke is afterward, at a red heat, from time to time, treated with steam or air, which is injected from below upward, or when this metalliferous coke is heated in a large and shallow furnace, and water sprinkled upon it in order to produce steam, or air blown over it, the remaining sulphur can all be expelled; and when no more sulphureted hydrogen or sulphurous acid appears the material made ready for the extracting process, either with quicksilver or with lead, or by any of the known chlorine or oxychlorine process.

The quantities to be mixed can, of course, be varied, according to the various ores or tailings under treatment, the chief object in this process being the intimate mixture of the ores or tailings with a hydrocarbonaceous matter, whereby the sulphurets are easier decomposed and brought to more minute division for the latter treatment; next, the formation of a metalliferous coke that can easily be handled and transported.

What I claim as my invention, and desire to secure by Letters Patent, is—

1. To treat sulphurets containing gold or silver in the way and for the purpose specified.

2. The compound obtained, denominated as "metalliferous coke," when prepared as above specified.

ANTHONY L. FLEURY.

Witnesses:
P. H. VAN DE WEYDE, M. D.,
GEO. C. RICHARDSON.